(12) United States Patent
Eisen et al.

(10) Patent No.: US 9,396,331 B2
(45) Date of Patent: Jul. 19, 2016

(54) SYSTEMS AND METHODS FOR SECURITY MANAGEMENT BASED ON CURSOR EVENTS

(75) Inventors: Ori Eisen, Scottsdale, AZ (US); Stephen George Pandich, Scottsdale, AZ (US)

(73) Assignee: THE 41ST PARAMETER, INC., Scottsdale, AZ (US)

( * ) Notice: Subject to any disclaimer, the term of this patent is extended or adjusted under 35 U.S.C. 154(b) by 503 days.

(21) Appl. No.: 12/988,796

(22) PCT Filed: Apr. 22, 2009

(86) PCT No.: PCT/US2009/041462
§ 371 (c)(1),
(2), (4) Date: Jan. 18, 2011

(87) PCT Pub. No.: WO2009/132148
PCT Pub. Date: Oct. 29, 2009

(65) Prior Publication Data
US 2011/0113388 A1 May 12, 2011

Related U.S. Application Data

(60) Provisional application No. 61/047,071, filed on Apr. 22, 2008.

(51) Int. Cl.
*G06F 3/01* (2006.01)
*G06F 21/55* (2013.01)
(Continued)

(52) U.S. Cl.
CPC .............. *G06F 21/554* (2013.01); *G06F 21/32* (2013.01); *G06F 21/552* (2013.01); *G06F 2221/2133* (2013.01)

(58) Field of Classification Search
USPC .............. 715/863, 856, 780; 726/26, 5, 1, 21; 345/163, 157
See application file for complete search history.

(56) References Cited

U.S. PATENT DOCUMENTS 5,519,827 A * 5/1996 Mizushima ........... G06F 3/0485
715/807
6,009,523 A * 12/1999 Owaki et al. .................... 726/21
(Continued)

FOREIGN PATENT DOCUMENTS

JP 05-257602 10/1993
JP 2000-276281 10/2000
(Continued)

OTHER PUBLICATIONS

International search report dated Dec. 1, 2009 for PCT Application No. US2009/41462.

*Primary Examiner* — Toan Vu
(74) *Attorney, Agent, or Firm* — Knobbe Martens Olson & Bear, LLP

(57) ABSTRACT

Systems and methods for security management based on cursor events. Click coordinates on a webpage of user's activity are logged in order to detect multiple or repeated transactions that bare the same exact coordinates. Such multiple or repeated activity may be helpful in detecting scripted attacks or bot net activity in a variety of environments and transactions. Further, the invention may also capture the coordinates of the location of submit buttons, and similar buttons, on a webpage to analyze whether a click action or other pointer action occurred within the button's parameters.

14 Claims, 6 Drawing Sheets

(51) Int. Cl.
*G06F 21/32* (2013.01)
*G06F 3/00* (2006.01)

(56) References Cited

U.S. PATENT DOCUMENTS

| | | | |
|---|---|---|---|
| 6,209,104 B1* | 3/2001 | Jalili | 726/18 |
| 6,687,390 B2 | 2/2004 | Avni et al. | |
| 7,197,646 B2 | 3/2007 | Fritz et al. | |
| 7,657,626 B1* | 2/2010 | Zwicky | 709/224 |
| 7,933,984 B1* | 4/2011 | Smith et al. | 709/224 |
| 8,201,099 B1* | 6/2012 | Osbourn et al. | 715/778 |
| 8,271,891 B1* | 9/2012 | Osbourn et al. | 715/764 |
| 8,321,269 B2* | 11/2012 | Linden et al. | 705/14.26 |
| 2001/0016840 A1* | 8/2001 | Hijikata et al. | 707/1 |
| 2002/0166063 A1* | 11/2002 | Lachman et al. | 713/200 |
| 2004/0001044 A1* | 1/2004 | Luciani et al. | 345/157 |
| 2004/0027385 A1* | 2/2004 | Rekimoto et al. | 345/773 |
| 2004/0073809 A1* | 4/2004 | Wing Keong | 713/201 |
| 2005/0008148 A1* | 1/2005 | Jacobson | 380/26 |
| 2006/0026669 A1 | 2/2006 | Zakas | |
| 2006/0136294 A1* | 6/2006 | Linden | G06Q 30/0257 705/14.47 |
| 2006/0224898 A1* | 10/2006 | Ahmed | 713/186 |
| 2006/0284838 A1* | 12/2006 | Tsatalos et al. | 345/156 |
| 2007/0011078 A1* | 1/2007 | Jain et al. | 705/37 |
| 2007/0061211 A1* | 3/2007 | Ramer | G06Q 20/12 705/25 |
| 2007/0097076 A1* | 5/2007 | Gross | 345/163 |
| 2007/0097976 A1 | 5/2007 | Wood et al. | |
| 2007/0107059 A1 | 5/2007 | Chasin et al. | |
| 2007/0162763 A1* | 7/2007 | Bender et al. | 713/186 |
| 2007/0255821 A1* | 11/2007 | Ge et al. | 709/224 |
| 2007/0271466 A1* | 11/2007 | Mak | G06F 21/316 713/184 |
| 2008/0046562 A1* | 2/2008 | Butler | 709/224 |
| 2008/0052629 A1* | 2/2008 | Phillips et al. | 715/736 |
| 2008/0162200 A1* | 7/2008 | O'Sullivan et al. | 705/7 |
| 2008/0162475 A1* | 7/2008 | Meggs | G06Q 30/02 |
| 2008/0163128 A1* | 7/2008 | Callanan et al. | 715/856 |
| 2008/0184372 A1* | 7/2008 | Hoshina | 726/24 |
| 2008/0201214 A1* | 8/2008 | Aaron | G06Q 30/02 705/14.47 |
| 2008/0281606 A1* | 11/2008 | Kitts | G06Q 30/02 705/1.1 |
| 2008/0301281 A1* | 12/2008 | Wang et al. | 709/224 |
| 2008/0319774 A1* | 12/2008 | O'Sullivan | G06Q 10/101 705/300 |
| 2009/0024971 A1* | 1/2009 | Willner et al. | 716/5 |
| 2009/0044282 A1* | 2/2009 | Govindaraju | 726/27 |
| 2009/0089869 A1* | 4/2009 | Varghese | 726/7 |
| 2009/0106413 A1* | 4/2009 | Salo | G06F 21/552 709/224 |
| 2009/0157417 A1* | 6/2009 | Bradley et al. | 705/1 |
| 2009/0164269 A1* | 6/2009 | Gupta | G06F 21/552 705/1.1 |
| 2009/0241174 A1* | 9/2009 | Rajan et al. | 726/5 |
| 2010/0321296 A1* | 12/2010 | Gross | 345/163 |
| 2010/0333170 A1* | 12/2010 | Cox et al. | 726/1 |
| 2012/0239774 A1* | 9/2012 | Tola et al. | 709/213 |
| 2012/0323788 A1* | 12/2012 | Keresman et al. | 705/44 |
| 2012/0323836 A1* | 12/2012 | Wright et al. | 706/46 |
| 2013/0097673 A1* | 4/2013 | Meehan et al. | 726/4 |
| 2013/0144539 A1* | 6/2013 | Allen et al. | 702/19 |

FOREIGN PATENT DOCUMENTS

| | | |
|---|---|---|
| KR | 10-1999-0015738 | 3/1999 |
| KR | 10-0645983 | 11/2006 |
| KR | 10-2009-0051977 | 9/2009 |
| WO | WO 2005/099166 A2 | 10/2005 |
| WO | WO 2005/099166 A3 | 5/2006 |
| WO | WO 2007/072238 A1 | 6/2007 |

\* cited by examiner

SYSTEMS AND METHODS FOR SECURITY MANAGEMENT BASED ON CURSOR EVENTS

CROSS-REFERENCE

This application claims the benefit of U.S. Provisional Application No. 61/047,071 filed Apr. 22, 2008, which application is incorporated herein by reference.

BACKGROUND

Automatic scripts present a number of problems faced by Internet users today. In one scenario, Internet users may receive SPAM or junk e-mail that has relatively little worth to most e-mail users but that may clutter e-mail inboxes, expend a great deal of bandwidth on the Internet, and result in slower response times and decreased efficiency. One of the main causes of SPAM are computers that use scripts to impersonate users. During the registration process for an e-mail address, a computer can use a script to generate multiple e-mail addresses that do not even have a corresponding human user. These multiple e-mail addresses can then be used by the computer to send unwanted e-mail messages to other Internet users.

Computers can be used to run scripts that send out multiple e-mail messages from a user generated e-mail address or from a script generated e-mail address to the same set of recipients. A computer user would take a great deal of time to send out a large number of e-mail messages to a set of recipients. On the other hand, a computer running a script can transmit e-mail messages at the speed that it would take thousands of computer users to perform the same task in the same amount of time.

Another area of services in which scripts post a large problem is Internet voting services and Internet contests. The Internet has many web pages in which users can participate in a poll. For instance, users can vote for their favorite musician, artist, athlete, etc. The user can always return to the web page and vote another time, but the chances are small that most users will bother trying to vote again. However, a computer can use a script to vote a large number of times in a very small amount of time. The result is that the voting results are skewed by a large amount. Further, a user that enters a contest will almost never win if a script places thousands of entries into the same contest.

Bot nets may be a collection of software robots, or bots, which run autonomously and automatically on groups of computers controlled remotely. The term "bot net" is also used to refer to any group of bots, a collection of compromised computers running programs, usually referred to as worms, Trojan horses, or backdoors, under a common command and control infrastructure. The bot nets may be controlled remotely, can run hidden, and can comprise the security of systems. Some bot nets may scan environments and propagate themselves using vulnerabilities and weak passwords.

Bot nets have been exploited for various purposes, including denial-of-service attacks, creation or misuse of SMTP mail relays for SPAM, click fraud, spamdexing and the theft of application serial numbers, login IDs, and financial information such as credit card numbers. For example, a bot net may be created and used to send e-mail SPAM. First, a bot net operator may send out viruses or worms, infecting an ordinary user's computer. Then, the "bot" on the infected computer may log into a particular server, which becomes the command-and-control server. Next, a spammer may purchase access to the bot net from the bot net operator, and the spammer may send instructions via the server to the infected computers, causing them to send out spam messages to mail servers.

Online banking services, online shopping applications, and other systems which require the entry of passwords or other sensitive information in a public environment are all susceptible to compromise. What are needed are systems and methods for security management that are user-friendly, not readily susceptible to observation during data entry, and resistant to interception and computational deciphering techniques.

SUMMARY OF INVENTION

The invention provides systems and methods for security management based on cursor events. Various aspects of the invention described herein may be applied to any of the particular applications set forth below. The invention may be applied as a standalone security system or as a component of an integrated solution for security management. The invention can be optionally integrated into existing business and security management processes seamlessly. It shall be understood that different aspects of the invention can be appreciated individually, collectively or in combination with each other.

It shall be understood that a variety of pointing devices are contemplated for use in the invention, including a mouse, touch-pad, trac-point, nub, trackball, etc. or any device that moves a cursor or pointer on a visual display. The invention shall not be limited by the examples described herein.

One aspect of the invention describes a method for security management. The invention may provide for security management by receiving and logging coordinate data for a mouse or other pointing device action by a user. The coordinate data may include X,Y coordinates on a display screen or within a web browser of the location of the pointer or cursor corresponding to the user's mouse or other pointing device. The system may then analyze the logged coordinate data, detect patterns of repetitive coordinate data, and then may proceed to block network attacks based on the patterns of repetitive coordinate data.

Another aspect of the invention provides a system for security management with a validation module for logging the coordinates of the pointer or cursor and detecting patterns of repetitive coordinate data. The system may obtain the parameters of the coordinates corresponding to a click of a pointing device on a web page and then log and analyze the coordinates. Because many transactions may bare the exact same coordinates, it may help detect scripted attacks or bot net activity. In addition, the system may obtain the parameters of the coordinates of the location of the button that the click action acted upon, to analyze whether the click action actually occurred within the coordinates of the button.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description below. In addition, embodiments of the present invention are not described with reference to any particular processor, programming language, machine code, etc. It will be appreciated that a variety of programming languages, machine codes, etc. may be used to implement the teachings of the invention as described herein.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

Some of the features of the invention are described as set forth in the following figures and description. A better understanding of the features and advantages of the invention will be obtained by reference to the following detailed description that sets forth illustrative embodiments provided in accordance with the invention.

DETAILED DESCRIPTION OF INVENTION

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

Figure 1:
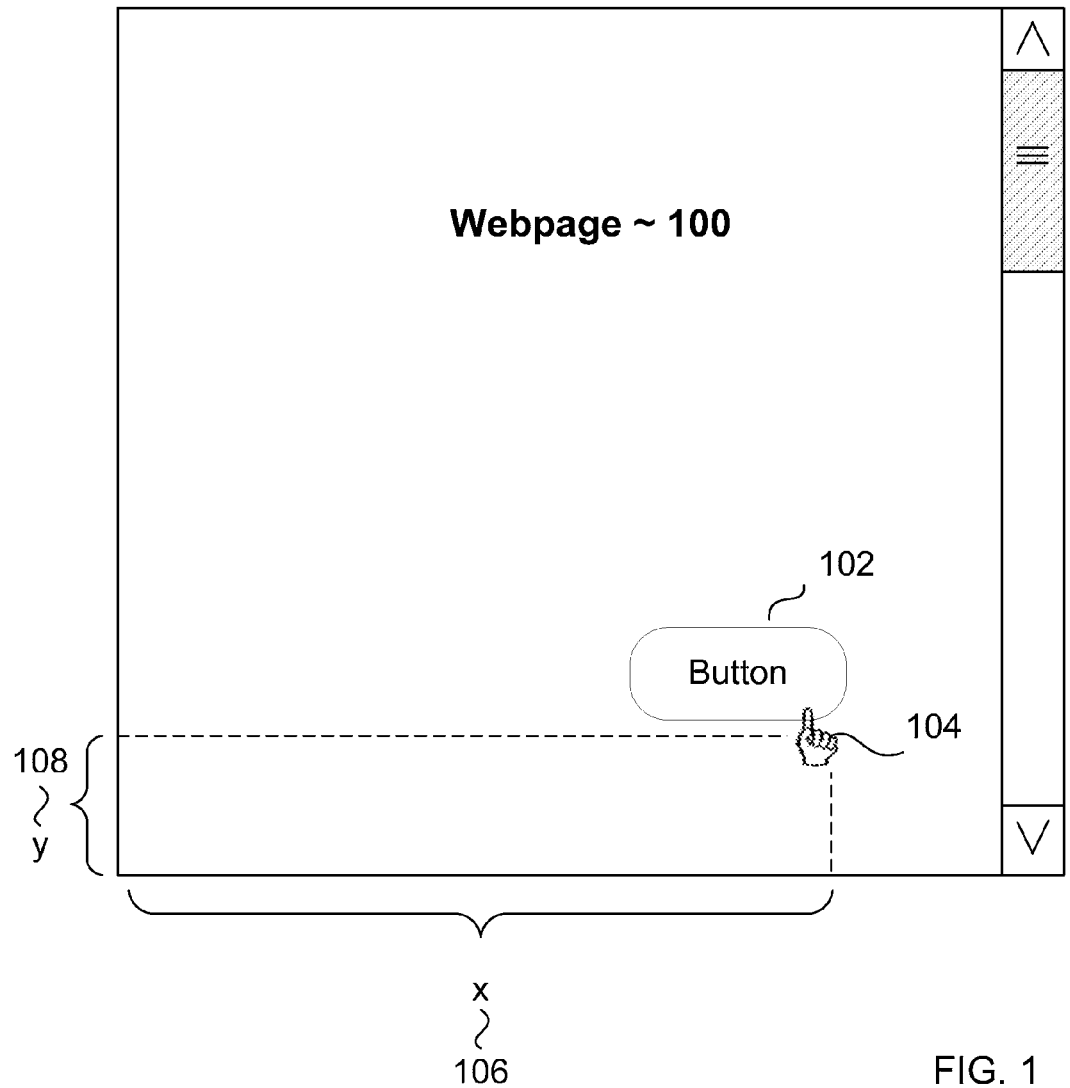
FIG. 1 describes an example of a webpage from which coordinate data can be obtained and analyzed for a click action or button.

Referring to FIG. 1, on a webpage 100, there may be a variety of buttons that a user may click on with a mouse or other pointing device 104. For example, a user may click on a submit button, an upload button, a verify button, a login button, or a variety of other buttons. It will be appreciated that a variety of other types of buttons or click actions are contemplated by the invention. It shall be understood that a variety of pointing devices are contemplated for use in the invention, including a mouse, touch-pad, trac-point, nub, trackball, etc. or any device that moves a cursor or pointer on a visual display. It shall also be understood and appreciated that a "click action" or "click" may refer to any action by any pointing device, including a tap, selection, etc., and the invention will not be limited to the examples described herein.

In one embodiment of the invention, when a user clicks on the webpage 100 with a pointing device 104, the X coordinate 106 and the Y coordinate 108 of the pointer action or cursor event may be logged. If the user is a human user and not a computer running a script, then the X and Y coordinates 106, 108 would most likely vary slightly with each transaction. If, however, a scripted attack or bot net activity provided the X and Y coordinates 106, 108, then it could be the case that many transactions would have the same exact X and Y coordinates 106, 108. In such a case where many transactions bare the same exact coordinates, the scripted attacks or bot net activity could be detected.

In another embodiment of the invention, the X and Y coordinates of the button 102 are also captured. The X and Y coordinates of the button 102 would be a range of coordinates that fall within the location of the button 102. When a user clicks on the webpage 100 with a mouse or other pointer device 104, the X coordinate 106 and the Y coordinate 108 of the click action or cursor (pointer) event may be logged. If a user is a human user and not a computer running a script, then the X and Y coordinates 106, 108 would be within the range of coordinates that fall within the location of the button 102. The system could then verify that the click event actually happened on the button 102. If, however, a scripted attack or bot net activity provided the X and Y coordinates 106, 108, then it could be the case that the X and Y coordinates 106, 108 provided by the scripted attack or bot net activity would fall outside of the coordinates within the location of the button 102. Thus, the system could verify that the click event did not happen on the button 102.

For example, in an online banking environment, if a user is logging into his or her account, the user may type in his user ID and password, and then click a submit or login button 104. The user's click action may have X coordinate 106 and Y coordinate 108, and those coordinates X, Y may be logged. In one embodiment of the invention, those coordinates X, Y corresponding to a login event, may be stored on a database. The system could verify whether the X and Y coordinates of the click action or cursor event fall within the coordinates of the location of the button 102. Further, the system could compare the X and Y coordinates of the click action 106, 108 to other X, Y coordinates for the transaction that were previously logged or stored. If the X and Y coordinates of the click action 106, 108 are the same exact coordinates of multiple previous transactions, and there is a pattern of repetitive coordinate data, then the system will be able to detect the possibility of a scripted attack or bot net activity.

Figure 2:
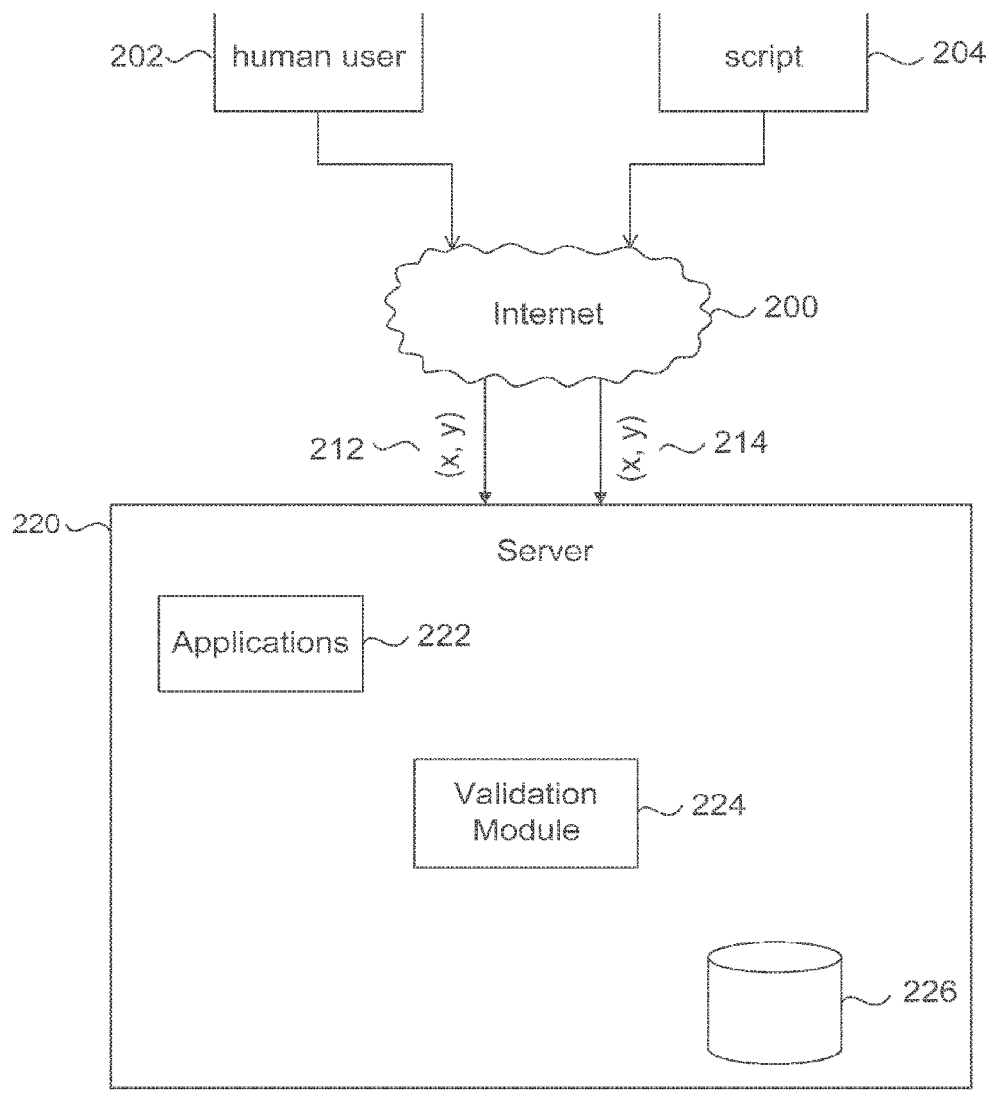
FIG. 2 shows an example of a system that may receive and analyze coordinate data from click actions from human users or scripts.

Referring to FIG. 2, on any given webpage a user 202 may submit, update, or access information over the Internet 200 by clicking on a button (e.g., a submit button, a login button, an upload button, etc.). When a user clicks on a button, the X and Y coordinates 212 of the cursor event may be sent to an application 222 on a server 220. The application 222 or a validation module 224 may verify whether the X and Y coordinates 212 of the click action fall within the coordinates of the location of the button. Further, the application 222 or a validation module 224 may store the X and Y coordinates 212 of the cursor event on a database 226. The validation module 224 may compare the X and Y coordinates 212 with the X and Y coordinates stored on the database 226. If the validation module 224 detects that many transactions bare the same exact coordinates, then it may alert other applications as to suspected scripted attacks or bot net activity.

In an embodiment of the invention, if a computer running a script 204 is accessing a webpage on the Internet 200, then it may send X and Y coordinates 214 to an application 222 on a server 220. The application 222 or a validation module 224 may verify whether the X and Y coordinates 214 fall within the coordinates of the location of the button that the X and Y coordinates 214 should correspond to. Thus, the application 222 or a validation module 224 may check to see whether the cursor event actually happened on the button on the webpage or not. Further, the application 222 or a validation module 224 may store the X and Y coordinates 214 of the cursor event on a database 226. The validation module 224 may compare the X and Y coordinates 214 with the X and Y coordinates stored on the database 226. Because the computer is running a script 204, it may be the case that many transactions bare the same exact X and Y coordinates. The validation module 224 may discover that the X and Y coordinates 214 are the exact same as many of the coordinates stored on the database, and thus can detect and alert other applications as to the suspected scripted attacks or bot net activity.

Figure 3:
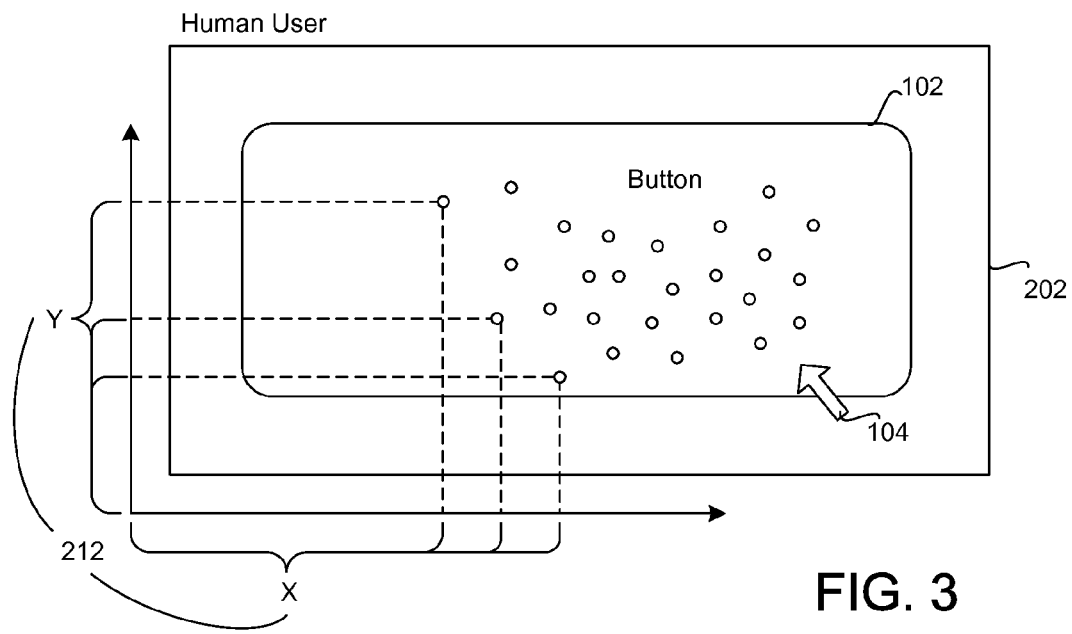
FIG. 3 shows an example of cursor events that may occur if a human user were clicking on a button on a webpage.
Figure 4:
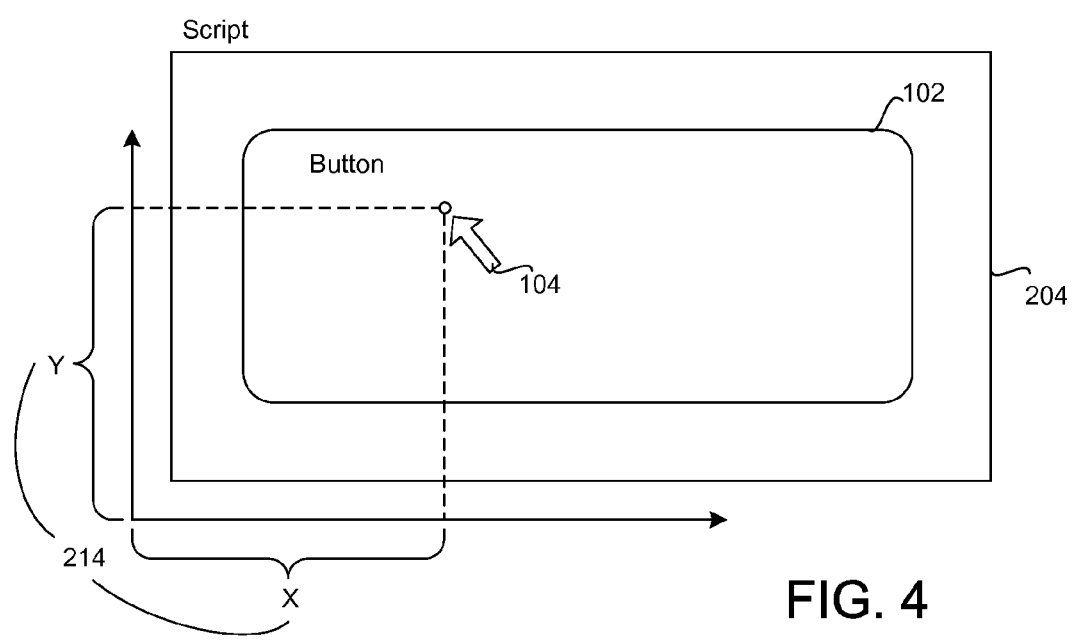
FIG. 4 shows an example of cursor events that may occur if a script were interacting with a webpage.

As shown in FIG. 3, a human user 202 may, in repeated transactions on a webpage, click on a button 102 with a cursor 104. When a human user 202 clicks on a button 102, the resulting X and Y coordinates 212 associated with the cursor events may vary slightly between clicks or cursor events. It is very unlikely that a human user 202 will click on the exact same X and Y coordinates 212 within button 102 repeatedly. In contrast, as shown in FIG. 4, a script 204 may, in repeated transactions on a webpage, simulate a user that would click on a button 102 with a cursor 104. In contrast to the human user who may produce varying X and Y coordinates 212, the automated script 204 may have repeated X and Y coordinates 214. Thus, if the system stores the X and Y coordinates 214 on a database or in memory, then the X and Y coordinates 214 of the automated script 204 will be identical and the same as previous X and Y coordinates stored on a database or in memory. Thus, a validation module may discover that the X and Y coordinates 214 are the exact same as many of the coordinates on the database. The validation module is then able to detect and alert other applications as to the suspected scripted attacks or bot net activity.

Further, in an alternative embodiment of the invention, the validation module may also be able to detect patterns of human action. For example, the system may be able to detect clicks that occur in a similar area or zone to help with user authentication. In one embodiment of the invention, the system may be able to detect a human user returning, by observing that the human users generally click in one area on a page. Thus, the individual click events may be compared to a "click heat," which observes in the aggregate where users click on a page.

In addition, other mouse metrics may be observed, logged and analyzed. Such components include mouse metrics such as accuracy, bias, click duration, confirmation dependency, convexity, double-click rhythm, mouse-down travel/drag, over-click, overshoot and braking, speed and acceleration, and tremor, jerking or wobbling. Such metrics are described in detail in U.S. Patent Publication No. 2005/0008148 (Jacobson) published on Jan. 13, 2005, which is hereby incorporated by reference in its entirety. Thus, such metrics may be used to authenticate a user of a mouse.

Figure 5:
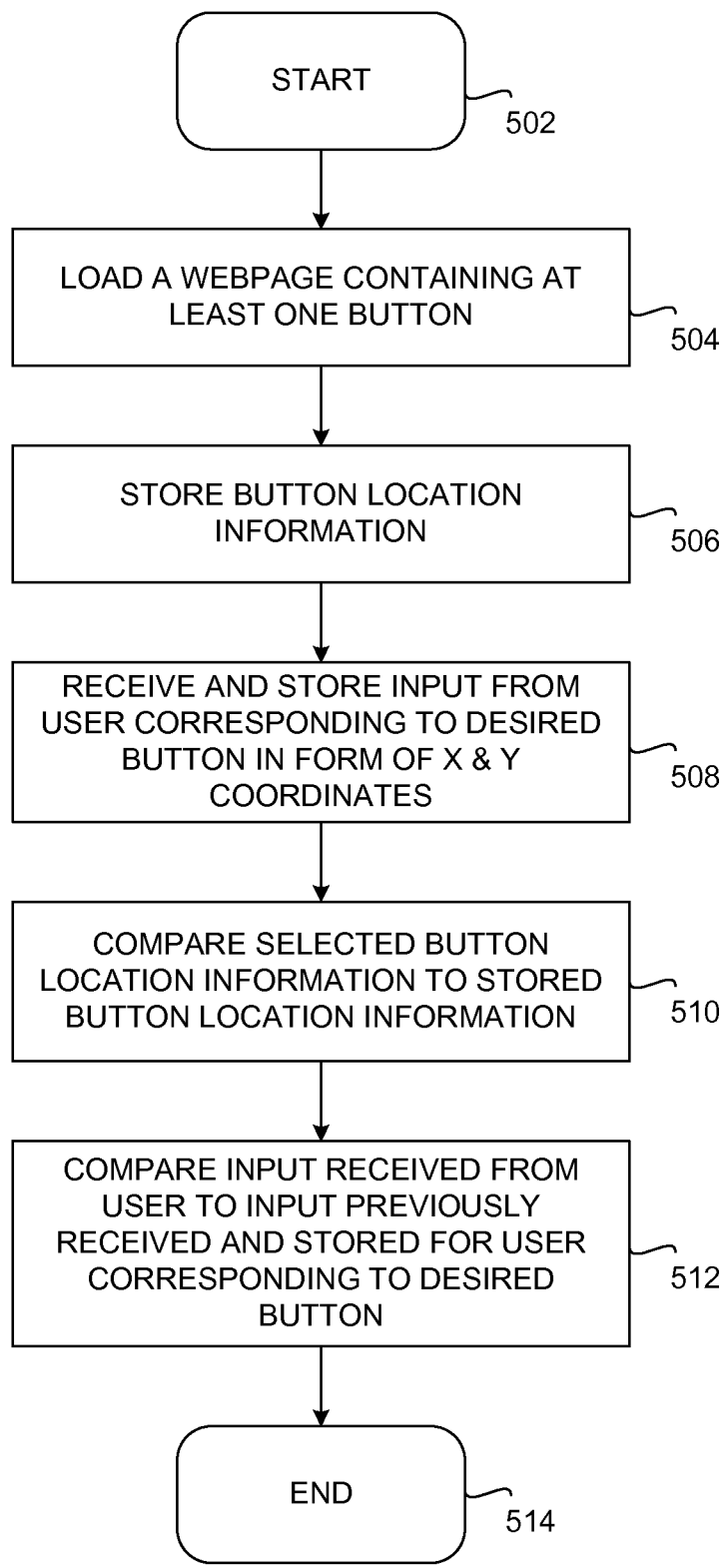
FIG. 5 is a flow diagram showing a method implemented according to the present invention.

FIG. 5 is a flow diagram showing a method implemented according to the present invention. In step 504, a webpage is loaded in a browser, and has at least one button. The button can be a submit button, an upload button, a find button, a login button, or any kind of button that is on a webpage. It shall be understood that the invention is not limited to any specific type of button, but rather contemplates all buttons that may be on a webpage. In step 506, the location of the button is stored. In one embodiment, the button's location information may be stored on a database or in memory. The X and Y coordinates of the button may be captured by a range of coordinates that fall within the location of the button. In step 508, when a user clicks on a button within a webpage, the X and Y coordinates of the click action or cursor (pointer) event may be received and stored.

In step 510, a comparison of the button's location information and the X and Y coordinates of the click action or cursor (pointer) event can be made. In one embodiment, the method could verify whether the X and Y coordinates of the click action fall within the coordinates of the location of the button. In step 512, a comparison of the X and Y coordinates of the click action and the X and Y coordinates of previous click actions for previous transactions can be made. The method could compare the X and Y coordinates of the click action of other X and Y coordinates for the transaction that were previously logged or stored. If the X and Y coordinates of the click action are the same exact coordinates as those of multiple previous transactions, then a pattern of repetitive coordinate data can be detected. The method, therefore, is able to detect the possibility of a scripted attack or bot net activity.

Figure 6:
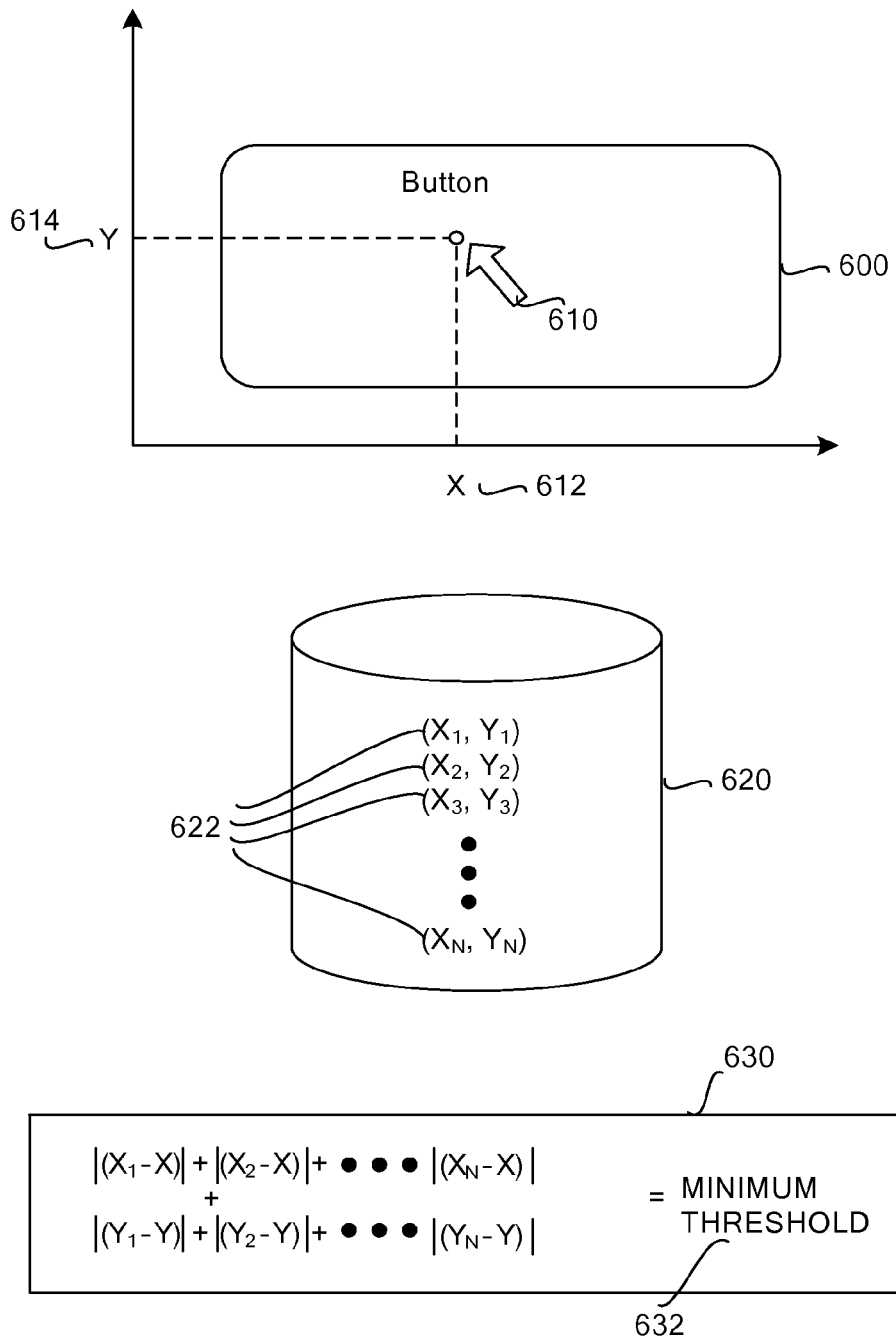
FIG. 6 illustrates one embodiment of analyzing coordinates of one click action with stored coordinates of previous transactions.

FIG. 6 illustrates the coordinates of a click action on a button 600, where coordinates X 612 and Y 614 can be compared to coordinates of previous transactions 622 that are stored on a database 620. The database 620 can be used in other embodiments of the invention, such as shows and described in FIG. 2. Alternatively, the coordinates may be logged or stored in memory. One way that this comparison can be done is illustrated by equation 630. The sum of differences between each previous X and Y coordinate stored on database 620 and the X coordinate 612 and Y coordinate 614 of the current click action must exceed a minimum threshold 632. Thus, the sum of the differences between each of coordinates $(X_1, Y_1), (X_2, Y_2), (X_3, Y_3) \ldots (X_N, Y_N)$ 622 stored on database 620 and current coordinates of the click action (X, Y) must meet a minimum threshold 632. $|(X_1-X)|+|(X_2-X)|+|(X_3-X)|+ \ldots |(X_N-X)|+|(Y_1-Y)|+|(Y_2-Y)|+|(Y_3-Y)|+ \ldots |(Y_N-Y)| \geq$ minimum threshold 632. This minimum threshold 632 may be a fixed value, or alternatively, may vary based on the number of previous coordinates 622 stored on database 620 for the particular transaction. For example, if there are only two sets of coordinates 622, then the minimum threshold 632 may be lower or higher than if there are a thousand sets of coordinates 622.

Figure 7:
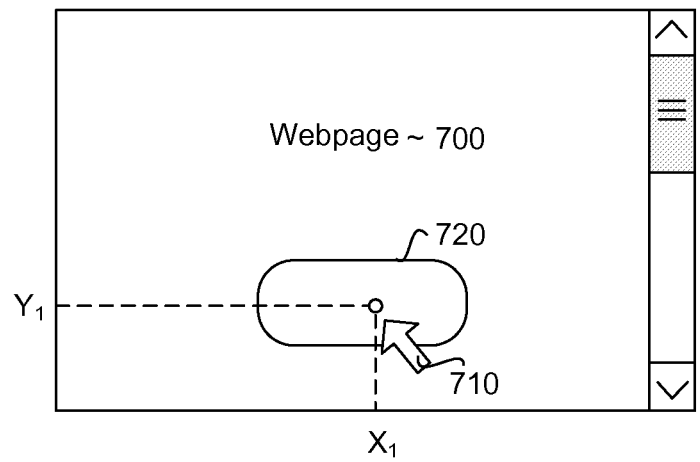
FIG. 7 illustrates an example of a set of webpages from which coordinate data can be obtained and analyzed for a click action or button.
Figure 7:
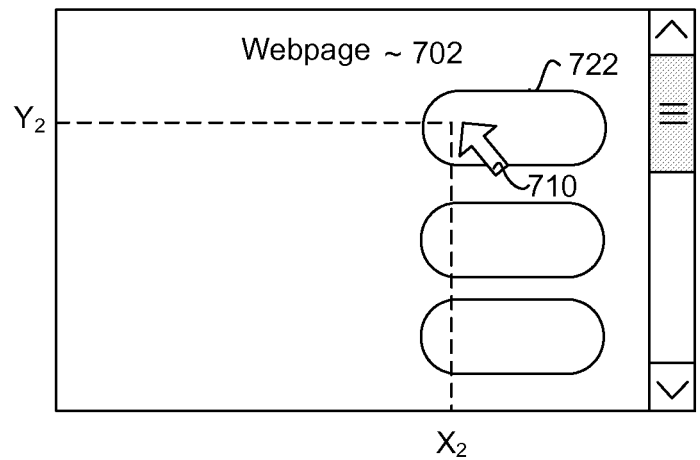
Figure 7:
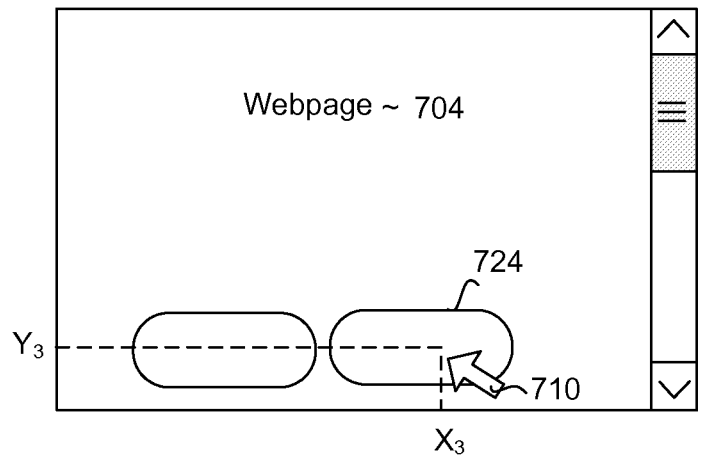

Referring to FIG. 7, the invention may also apply to a series of click actions or cursor (pointer) events. For example, if a login process requires three separate steps in which a user must click on three separate buttons, then the invention would apply across those three steps and three different webpages 700, 702, and 704. To illustrate, on webpage 700, a user may click a button 720 which will result in webpage 702 being loaded. On webpage 702, a user may click a button 722, which results in webpage 704 being loaded. Then, a user may click on button 724, and so on. Instead of only logging or storing one set X and Y coordinates, the invention may log and store both the individual $X_1$ and $Y_1$ coordinates associated with button 720 and also a set of coordinates $(X_1, Y_1)$, $(X_2, Y_2)$, and $(X_3, Y_3)$ associated with the transaction. The system may verify that each click event actually happened on each button. Further, the system could compare the set of coordinates $(X_1, Y_1)$, $(X_2, Y_2)$, and $(X_3, Y_3)$ associated with the transaction with previous sets of coordinates stored on a database or in memory. If the set of coordinates are the same exact set of coordinates of multiple previous transactions, and there is a pattern of repetitive coordinate data, then the system will be able to detect the possibility of a scripted attack or bot net activity. When scripted attacks or bot net activity is detected, then the suspect activity may be blocked by the user interface, or an administrator or website administrator or operator may take appropriate action regarding the detection of automated activity.

In another embodiment, the system according to the present invention may include a sensor (or microsensor) which captures or gathers data relating to the movement of a mouse. A local memory may store the raw data, and software components that are accessible by the client server may communicate the data to a server. On the server side, a comparison may be made of the raw data gainst the previously logged data in a database, and a validation module may determine a value indicating the likelihood or probability of the user being the authorized person or the likelihood or probability of the user being a human user.

In addition to detecting scripted or bot net activity for security management, methods and systems described herein may be used to facilitate authentication in a variety of contexts, including but not limited to: customers making an online purchase or any online transaction, release of medical information online, an internet voting system, entering online sweepstakes, purchasing tickets online for an event, etc.

All concepts of the invention may be incorporated or integrated with other systems and methods of facilitating authentication of users of mouse devices, including but not limited to those described in U.S. Patent Publication No. 2005/0008148 (Jacobson) published on Jan. 13, 2005, which is hereby incorporated by reference in its entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A non-transitory computer readable medium storing program instructions for detecting activity by automatically controlled software robots within a user interface designed for a human user during a transaction on a computer, the program instructions configured to cause one or more computer processors to perform operations comprising:

storing in a database, by one or more computer processors, information about a first graphical user interface associated with a first transaction type, the first graphical user interface including a first user-selectable area with a first predefined location on the first graphical user interface;

storing in the database, by the one or more computer processors, a plurality of X and Y historical coordinate pairs each comprising an X coordinate position and a Y coordinate position that represent locations on the first graphical user interface and associated with the first user-selectable area in which previous users had performed selection actions by one or more user selection devices in association with transactions of the first transaction type;

storing in the database, by the one or more computer processors, a minimum location proximity threshold value that indicates activity that is not from automatically controlled software robots, wherein the minimum location proximity threshold value varies based at least in part on a number of X and Y historical coordinate pairs stored in the database;

receiving a first X and Y coordinate pair comprising a first X coordinate position and a first Y coordinate position that represent a first location on the first graphical user interface and associated with the first user-selectable area in which a selection action has been performed in association with a first transaction of the first transaction type;

determining X differences between the X coordinate position of each of the plurality of X and Y historical coordinate pairs with the first X coordinate position;

determining Y differences between the Y coordinate position of each of the plurality of X and Y historical coordinate pairs with the first Y coordinate position;

analyzing the X differences and the Y differences to determine whether the X differences and the Y differences meet the minimum location proximity threshold value, wherein differences below the minimum location proximity threshold indicate activity by an automatically controlled software robot and differences above the minimum location proximity threshold indicate activity not by an automatically controlled software robot if the X differences and the Y differences do not meet the minimum location proximity threshold value, generating an electronic data packet for transmission to a first computer application, the electronic data packet including an electronic indication of potential risk of action by an automatically controlled software robot; and generating instructions to block network attacks based on the indication of potential risk of action by an automatically controlled software robot.

2. The non-transitory computer readable medium of claim 1, wherein the electronic data packet further includes the instructions to block network attacks.

3. The non-transitory computer readable medium of claim 1, further comprising: setting the minimum location proximity threshold value based at least in part on a number of X and Y historical coordinate pairs stored in the database.

4. The non-transitory computer readable medium of claim 1, wherein the first user-selectable area is a button within the first graphical user interface.

5. A system for electronically detecting activity automatically controlled software robots within a user interface designed for a human user during a transaction on a computer, the system comprising:
- a physical data store configured to store information about a first graphical user interface associated with a first transaction type, the first graphical user interface including a first user-selectable area with a first predefined location on the first graphical user interface;
- an electronic hardware memory configured to store software instructions; and
- a first hardware computing device in communication with the physical data store and the electronic hardware memory, the first hardware computing device configured to execute the software instructions stored in the electronic hardware memory in order to:
- store in the physical data store a plurality of X and Y historical coordinate pairs each comprising an X coordinate position and a Y coordinate position that represent locations on the first graphical user interface and associated with the first user-selectable area in which previous users had performed selection actions by one or more user selection devices in association with transactions of the first transaction type;
- store in the physical data store a minimum location proximity threshold value that indicates activity that is not from automatically controlled software robots, wherein the minimum location proximity threshold value varies based at least in part on a number of X and Y historical coordinate pairs stored in the database;
- store in the physical data store a minimum location proximity threshold value that indicates activity that is not from automatically controlled software robots;
- receive a first X and Y coordinate pair comprising a first X coordinate position and a first Y coordinate position that represent a first location on the first graphical user interface and associated with the first user-selectable area in which a selection action has been performed in association with a first transaction of the first transaction type;
- determine X differences between the X coordinate position of each of the plurality of X and Y historical coordinate pairs with the first X coordinate position;
- determine Y differences between the Y coordinate position of each of the plurality of X and Y historical coordinate pairs with the first Y coordinate position;
- analyze the X differences and the Y differences to determine whether the X differences and the Y differences meet the minimum location proximity threshold value, wherein differences below the minimum location proximity threshold indicate activity by an automatically controlled software robot and differences above the minimum location proximity threshold indicate activity not by an automatically controlled software robot;
- if the X differences and the Y differences do not meet the minimum location proximity threshold value, generate an electronic data packet for transmission to a first computer application, the electronic data packet including an electronic indication of potential risk of action by an automatically controlled software robot; and
- generate instructions to block network attacks based on the indication of potential risk of action by an automatically controlled software robot.

6. The system of claim 5, wherein the selection is a mouse click and the first user selectable area is user interface button within the first graphical user interface.

7. The system of claim 5, wherein the electronic data packet further includes the instructions to block network attacks.

8. The system of claim 5, the software instructions further including: setting the minimum location proximity threshold value based at least in part on a number of X and Y historical coordinate pairs stored in the database.

9. The system of claim 5, wherein the minimum location proximity threshold value is equal to or close to zero.

10. A method for electronically detecting activity automatically co trolled software robots within a user interface designed for a human user during a transaction on a computer, the method comprising:
- under control of one or more hardware computing devices configured with specific computer executable instructions stored in an electronic hardware memory,
- storing in a database, by the one or more computer processors, a plurality of X and Y historical coordinate pairs each comprising an X coordinate position and a Y coordinate position that represent locations on the first graphical user interface and associated with the first user-selectable area in which previous users had performed selection actions by one or more user selection devices in association with transactions of the first transaction type;
- storing in the database, by the one or more computer processors, a minimum location proximity threshold value that indicates activity that is not from automatica ly controlled software robots;
- storing in the database, by the one or more computer processors, a minimum location proximity threshold value that indicates activity that is not from automatically controlled software robots, wherein the minimum location proximity threshold value varies based at least in part on a number of X and Y historical coordinate pairs stored in the database;
- receiving a first X and Y coordinate pair comprising a first X coordinate position and a first Y coordinate position that represent a first location on the first graphical user interface and associated with the first userseectabe area in which a selection action has been performed in association with a first transaction of the first transaction type;
- determining X differences between the X coordinate position of each of the plurality of X and Y historical coordinate pairs with the first X coordinate position;
- determining Y differences between the Y coordinate position of each of the plurality of X and Y historical coordinate pairs with the first Y coordinate position;
- analyzing the X differences and the Y differences to determine whether the X differences and the Y differences meet the minimum location proximity threshold value, wherein differences below the minimum location proximity threshold indicate activity by an auto atically controlled software robot and differences above the minimum location proximity threshold indicate activity not by an automatically controlled software robot; and
- if the X differences and the Y differences do not meet the minimum location proximity threshold value, generating an electronic data packet for transmission to a first computer application, the electronic data packet including an electronic indication of potential risk of action by an automatically controlled software robot; and
- generating instructions to block network attacks based on the indication of potential risk of action by an auto atically controlled software robot.

11. The method of claim 10, wherein the electronic data packet further includes the instructions to block network attacks.

12. The method of claim 10, further comprising setting the minimum location proximity threshold value based at least in part on a number of X and Y historical coordinate pairs stored in the database.

13. The method of claim 10, wherein the minimum location proximity threshold value is equal to or close to zero.

14. The method of claim 10, wherein the first user-selectable area is a button within the first graphical user interface.

* * * * *